(12) United States Patent
Chen et al.

(10) Patent No.: US 10,176,193 B2
(45) Date of Patent: Jan. 8, 2019

(54) HOLDING SPECIFIC VERSIONS OF A DOCUMENT

(71) Applicant: International Business Machines Corporation, Armonk, NY (US)

(72) Inventors: Ning Chen, Beijing (CN); Khanh M. Le, Round Rock, TX (US); Yong L. Li, Beijing (CN); Randal J. Richardt, San Jose, CA (US); Phong K. Truong, San Jose, CA (US); Alan T. Yaung, San Jose, CA (US); Xian Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 14/312,531

(22) Filed: Jun. 23, 2014

(65) Prior Publication Data

US 2015/0370792 A1    Dec. 24, 2015

(51) Int. Cl.
  *G06F 17/30*    (2006.01)
(52) U.S. Cl.
  CPC .... *G06F 17/3023* (2013.01); *G06F 17/30011* (2013.01); *G06F 17/30082* (2013.01)
(58) Field of Classification Search
  CPC ......... G06F 17/30011; G06F 17/30073; G06F 17/30082; G06F 17/30091
  See application file for complete search history.

(56) References Cited

U.S. PATENT DOCUMENTS

| | | | | |
|---|---|---|---|---|
| 5,983,241 A * | 11/1999 | Hoshino | ............. | G06F 17/2288 |
| 6,312,364 B1 * | 11/2001 | Selsam | .................. | A63B 21/06 |
| | | | | 206/501 |
| 7,099,899 B2 * | 8/2006 | Choy | ................ | G06F 17/30309 |
| 7,689,578 B2 * | 3/2010 | Albornoz | ............ | G06F 17/2288 |
| | | | | 715/229 |
| 7,703,008 B2 | 4/2010 | Ingersoll et al. | | |
| 7,836,019 B2 | 11/2010 | Baker et al. | | |
| 8,010,887 B2 * | 8/2011 | Soria, Jr. | ........... | G06F 17/30309 |
| | | | | 707/638 |
| 8,028,169 B2 | 9/2011 | Yoshioka | | |
| 8,051,047 B2 | 11/2011 | Takahashi | | |
| 8,201,079 B2 * | 6/2012 | Cragun | ................. | G06F 17/241 |
| | | | | 715/229 |
| 8,301,722 B2 * | 10/2012 | Gimson | ................. | G06Q 10/10 |
| | | | | 709/217 |
| 8,656,159 B1 * | 2/2014 | Donahue | ................. | H04L 9/088 |
| | | | | 380/277 |
| 8,910,117 B2 * | 12/2014 | Li | ............................ | G06F 8/71 |
| | | | | 717/120 |
| 9,363,940 B2 * | 6/2016 | Kennedy | ............. | A01G 9/0291 |

(Continued)

OTHER PUBLICATIONS

US Patent Application, dated Feb. 18, 2015, for U.S. Appl. No. 14/626,397, filed Feb. 19, 2015, invented by Ning Chen et al., Total 31 pages.

(Continued)

*Primary Examiner* — Daniel A Kuddus

(74) *Attorney, Agent, or Firm* — Janaki K. Davda; Konrad, Raynes, Davda and Victor LLP

(57) ABSTRACT

Provided are techniques for holding versions of a document. In response to adding a version of an item to a hold container, another version of the item is automatically added to the hold container based on a hold version policy type associated with the hold container.

12 Claims, 11 Drawing Sheets

(56) References Cited

U.S. PATENT DOCUMENTS

| | | | |
|---|---|---|---|
| 2003/0061245 A1* | 3/2003 | Soria, Jr. | G06F 17/30309 |
| 2003/0200235 A1* | 10/2003 | Choy | G06F 17/30309 |
| 2005/0160355 A1* | 7/2005 | Cragun | G06F 17/241 |
| | | | 715/230 |
| 2005/0160356 A1* | 7/2005 | Albornoz | G06F 17/2288 |
| | | | 715/229 |
| 2005/0203969 A1* | 9/2005 | Kawabe | G06F 17/30085 |
| 2006/0095421 A1 | 5/2006 | Nagai et al. | |
| 2007/0043686 A1* | 2/2007 | Teng | G06F 17/30923 |
| 2007/0130627 A1* | 6/2007 | Yoshioka | G06F 21/645 |
| | | | 726/27 |
| 2008/0072217 A1* | 3/2008 | Li | G06F 8/71 |
| | | | 717/170 |
| 2009/0024574 A1* | 1/2009 | Timmons | G06F 17/30864 |
| 2009/0024674 A1* | 1/2009 | Gallagher | G06F 17/2288 |
| 2009/0183150 A1* | 7/2009 | Felts | G06F 8/60 |
| | | | 717/173 |
| 2010/0014123 A1 | 1/2010 | Nagarajan | |
| 2010/0077453 A1 | 3/2010 | Mohanty | |
| 2011/0093471 A1* | 4/2011 | Brockway | G06F 17/30616 |
| | | | 707/747 |
| 2012/0246130 A1 | 9/2012 | Schmidt | |
| 2012/0254134 A1* | 10/2012 | Talati | G06F 17/30011 |
| | | | 707/695 |
| 2012/0254143 A1 | 10/2012 | Varma et al. | |
| 2013/0080342 A1 | 3/2013 | Talati et al. | |
| 2014/0095456 A1* | 4/2014 | Pidduck | G06F 17/30309 |
| | | | 707/695 |
| 2015/0370793 A1 | 12/2015 | Chen et al. | |
| 2015/0370809 A1* | 12/2015 | Humby | G06F 17/30085 |
| | | | 707/694 |

OTHER PUBLICATIONS

Preliminary Amendment, dated Feb. 19, 2015, for U.S. Appl. No. 14/626,397, filed Feb. 19, 2015, invented by Ning Chen et al., Total 4 pages.

List of IBM Patents or Patent Applications Treated as Related, Total 2 pp., Feb. 19, 2015.

Bogue, Robert; "Building Enterprise Records Management Solutions for SharePoint 2010", SPTechCon Corporation, Mar. 3, 2013, pp. 1-40.

ip.com et al.; "Version Management for Multi-Part Documents Using IBM Content Manager", IPCOM000143240D, Nov. 17, 2006, pp. 1-3.

Final Office Action, dated Mar. 30, 2018, for U.S. Appl. No. 14/626,397, filed Feb. 19, 2015, invented by Ning Chen et al., Total 14 pages.

Office Action, dated Oct. 18, 2017 for U.S. Appl. No. 14/626,397, filed Feb. 19, 2015, invented by Ning Chen et al., Total 26 pages.

Response to Office Action, dated Jan. 18, 2018, for U.S. Appl. No. 14/626,397, filed Feb. 19, 2015, invented by Ning Chen et al., Total 15 pages.

Response to Final Office Action, dated Jun. 28, 2018, for U.S. Appl. No. 14/626,397, filed Feb. 19, 2015, invented by Ning Chen et al., Total 15 pages.

Notice of Allowance, dated Aug. 14, 2018, for U.S. Appl. No. 14/626,397, filed Feb. 19, 2015, invented by Ning Chen et al., Total 16 pages.

* cited by examiner

Hold Container Table
                                        200

| Hold Container ID | Item Version ID | Hold Version Policy Type | Hold Flag | ••• |
|---|---|---|---|---|
|  |  |  |  |  |
|  |  |  |  |  |
|  |  |  |  |  |

FIG. 2

Hold Link Table

| Hold Container ID | Item ID | Item Version ID | Timestamp | Link Item ID | ••• |
|---|---|---|---|---|---|
| | | | | | |
| | | | | | |
| | | | | | |

FIG. 4

HOLDING SPECIFIC VERSIONS OF A DOCUMENT

FIELD

Embodiments of the invention relate to holding specific versions of a document. In certain embodiments, the versions of the document are stored in a content management system.

BACKGROUND

Customers may need to hold (e.g., retain) documents for various reasons (e.g., documents that are part of on-going litigation or investigation). When a document is placed on hold, the document is not deleted until the hold is removed. This allows documents to be kept (e.g., for legal reasons) and then deleted when appropriate (e.g., when the legal action is resolved).

A content management system may be described as managing unstructured data, such as documents, videos, audio, etc. The content management system allows creation of hold containers, and documents may be placed into the hold containers.

A current practice to place a hold on documents is to create one or more hold containers to store and manage a group of hold documents. A hold link relationship is created between the hold container and hold documents in that hold container to archive hold capability. With this solution, once one document version is put on-hold, the other existing versions and the versions created in the future will be on hold automatically. Also, if a hold is removed from any version of this document, then the hold is removed from all versions of the document, and the other versions may be deleted. Moreover, if there is a maximum version constraint on a document, and there is a hold on that document, then, once the maximum number of versions have been created, it is not possible to delete one version to create another version.

SUMMARY

Provided is a method for holding specific versions of a document. The method comprises, in response to adding a version of an item to a hold container, automatically adding, with a processor of a computer, one or more versions of the item to the hold container based on a hold version policy type associated with the hold container.

Provided is a computer program product for holding specific versions of a document. The computer program product comprises a computer readable storage medium having program code embodied therewith, the program code executable by at least one processor to perform: in response to adding a version of an item to a hold container, automatically adding, with a processor of a computer, another version of the item to the hold container based on a hold version policy type associated with the hold container.

Provided is a computer system for holding specific versions of a document. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations, the operations comprising: in response to adding a version of an item to a hold container, automatically adding, with a processor of a computer, another version of the item to the hold container based on a hold version policy type associated with the hold container.

BRIEF DESCRIPTION OF THE SEVERAL VIEWS OF THE DRAWINGS

In the drawings, like reference numbers represent corresponding parts throughout.

FIG. 2 illustrates a hold container table with new attributes in accordance with certain embodiments.

FIG. 4 illustrates a hold link table in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
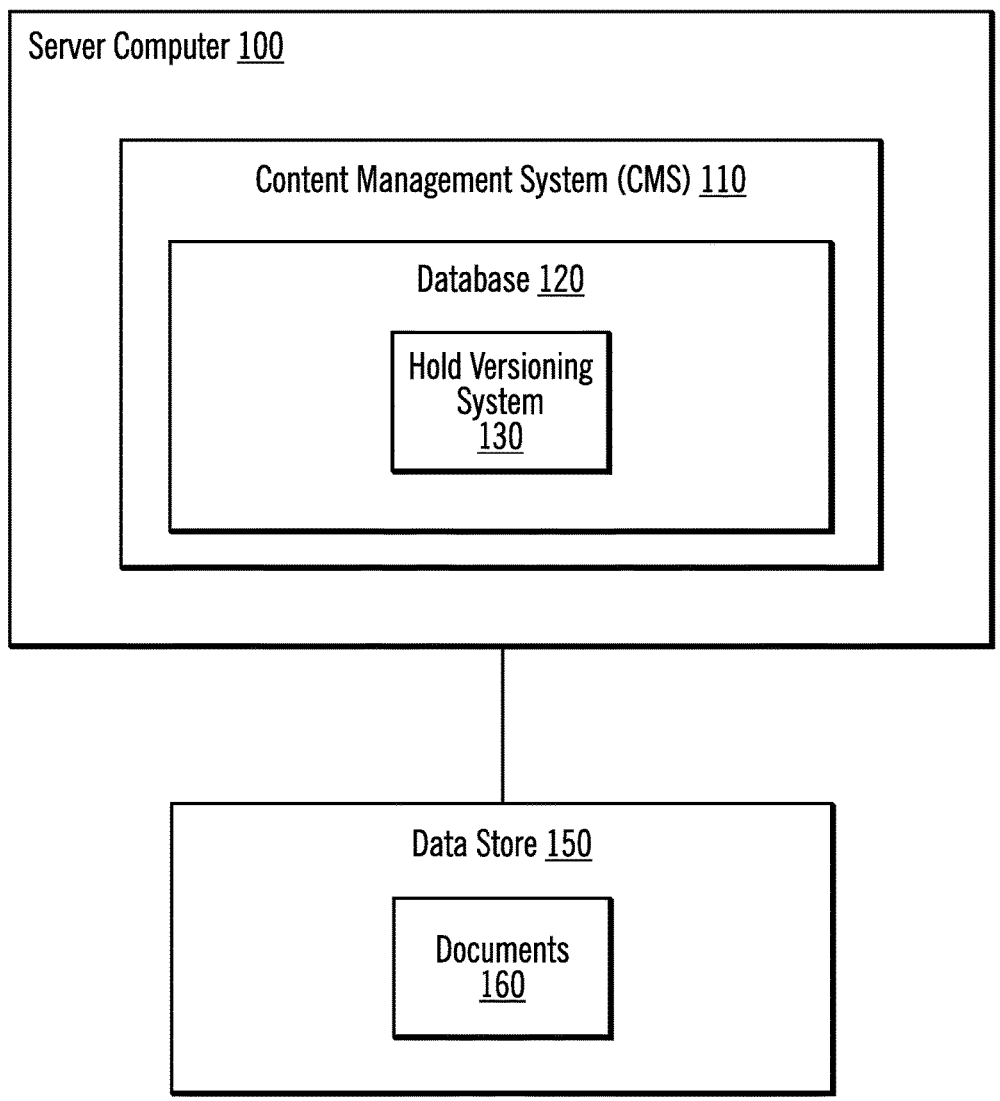
FIG. 1 illustrates, in a block diagram, a computing environment in accordance with certain embodiments.

FIG. 1 illustrates, in a block diagram, a computing environment in accordance with certain embodiments. A server computer 100 includes a content management system 110. The content management system 110 includes a database 120, and the database 120 includes a hold versioning system 130. The server computer is also coupled to a data store 150. The data store 150 includes documents 160 that are managed by the content management system 110. The hold versioning system 130 places holds on specific versions of documents.

The hold versioning system 130 holds versions of documents in the content management system 110. In certain embodiments, the hold versioning system 130 adds a version attribute in a hold type link when a user places a document in a hold container. The user may provide the hold container identifier (ID), the on-hold document identifier (ID), and the on-hold document version number. In certain embodiments, internally, each on-hold document version has its own hold linkages, and a version which has no hold linkage is not an on-hold version, hence this version may be deleted. In certain embodiments, when a document version is to be held, the document version may not be updated or deleted.

In order to provide better usability, a hold version policy type is associated with a hold container. When a user creates a hold container, the user may choose to specify a hold version policy for the container by identifying the hold version policy type.

The content management system 110 manages items. An item may be a document, video, audio, etc. Also, the item contains attributes to describe the other items (e.g., other documents, videos, audios, etc.) with which the item is associated.

An item type may be described as a template of items, and items are created from an item type. The item type may be defined by an administrator who specifies attributes, item association types, hold flags, etc. When an item is created from the item type, a user may assign values for attributes and upload items of this item type.

An item type may be declared as a hold container item type, and this means items created under this item type may be hold containers. An item type that is not declared as hold container item type is not used to create hold containers. Thus, a hold container is a type of item created based on a hold container item type.

When an update operation is performed on an item, according to a version enablement flag, the hold versioning system 130 updates attribute values and associated items in the item directly or creates a new version of the item with the new, updated attribute values and associated items.

With embodiments, several specific attributes are introduced for the hold container, while retaining some attributes that are common across different item types. A hold container may be created under an item type that is declared as an item type for the hold container. When an item type is declared as the item type for the hold container; the instance container table for this item type is created or altered with columns for the hold container. FIG. 2 illustrates a hold container table 200 with new attributes in accordance with certain embodiments. Table 200 includes the following attributes: a hold container identifier (Hold Container ID), an item version identifier (Item Version ID), a hold version policy type for the hold container (Hold Version Policy Type) that specifies one of four hold policies, and a hold flag (Hold Flag) that indicates whether items held by this hold container can be updated in their metadata. The hold version policy type and the hold flag are new attributes. In table 200, the ellipses indicate that there may be one or more other columns in the hold container table.

When a hold container is created under a hold container item type, a corresponding row is inserted into a hold container table (having the columns shown in table 200). During the hold container creation, a user may decide whether to assign a value to the hold version policy type attribute that retains the hold version policy type for this hold container. In certain embodiments, the hold container identifier is 26 characters, is a key column, and has the constraint "NOT NULL". In certain embodiments, the item version identifier is a small integer, is a key column, and has the constraint "NOT NULL". In certain embodiments, the hold version policy type is a small integer, is not a key column, and has the constraint "NOT NULL, DEFAULT: 1". In certain embodiments, the hold flag is a small integer, is not a key column, and has the constraint "NOT NULL, DEFAULT: 1".

Figure 3A:
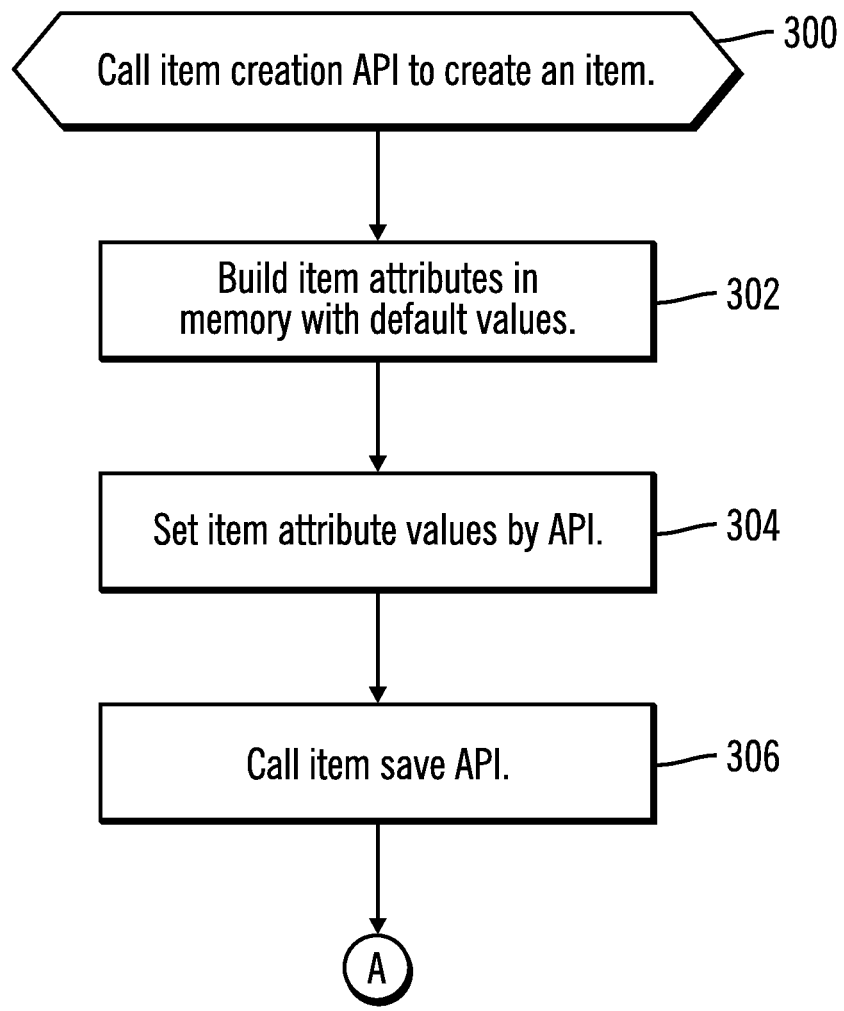
FIGS. 3A and 3B illustrate, in a flow chart, operations for creating an item before that item is added into a hold container in accordance with certain embodiments of the invention.
Figure 3B:
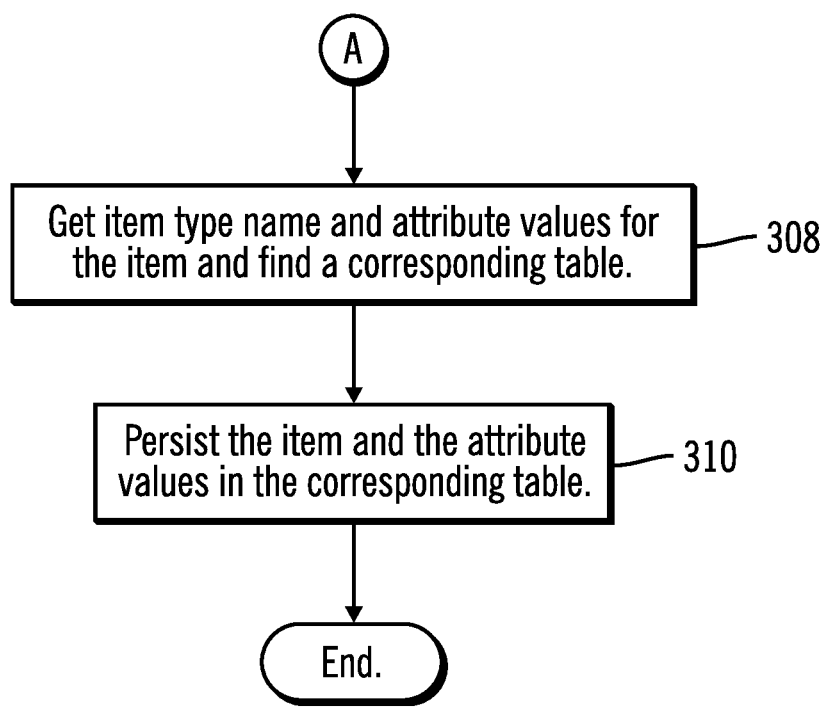

FIGS. 3A and 3B illustrate, in a flow chart, operations for creating an item in accordance with certain embodiments of the invention. In certain embodiments, the created item is one that is to be inserted into a hold container table. In certain embodiments, the created item is a hold container.

Control begins at block 300 (FIG. 3A) with the hold versioning system 130 calling a create item Application Programming Interface (API) to create an item. In block 302, the hold versioning system 130 builds item attributes in memory with default values. In block 304, the hold versioning system 130 sets the item attribute values by the create item API. In certain embodiments, the item attribute values for an item created as a hold container are: a hold container identifier, an item version identifier, a hold version policy type for the hold container, and a hold flag. In block 306, the hold versioning system 130 calls an item save API. From block 306 (FIG. 3A), processing continues to block 308 (FIG. 3B). In block 308, the hold versioning system 130 gets an item type name and attribute values for the item and finds a corresponding table. If the item being created is a hold container, then, the corresponding table is a hold container table. If the item being created is not a hold container, then, the corresponding table is an item table. In certain embodiments, the item table has the columns of the hold container table, but without the columns for the hold version policy type and the hold flag. When a hold container is created under an item type, a corresponding row is inserted into a hold container table. In block 310, the hold versioning system 130 persists the item and the attribute values in the corresponding table.

In certain embodiment, the following hold polices are the valid values for the hold version policy type attribute associated with a hold container. In such embodiments, a user may assign one of these values when setting the item attribute values (block 304 in FIG. 3). In certain embodiments, if an attribute value is not set for an attribute, then the attribute has a default attribute value.

In certain embodiments, the hold policies may be referred to as auto-binding policies as they may automatically bind existing versions and/or newly created, future versions to a hold version policy type.

Hold specific version type (hold version policy #1): In certain embodiments, this may be the default value of the hold version policy type attribute. With the hold specific version type, when a specific version is put in this hold container, no other versions of this item will be put into this hold container automatically. For example, if there are versions 1, 2, 3, 4, and 5 (created in that order), then version 3 may be treated as the specific version that is put into the hold container, and versions 1, 2, 4, and 5 are not automatically put into the hold container.

Hold all versions type (hold version policy #2): When a specific version is put in this hold container, all other existing (older and newer) versions and newly created, future versions, will be put into this hold container automatically. The term "older" (or "past") version may refer to any version created before the "specific" version has been created (e.g., based on timestamps associated with the versions). The term "newer" (or "future") version may refer to any version created after the "specific" version has been created (e.g., based on timestamps associated with the versions). For example, if there are versions 1, 2, 3, 4, and 5 (created in that order), and version 3 is put into the hold container with the hold all versions policy type, then, older versions 1 and 2 and newer versions 4 and 5 will be put into this hold container automatically. Also, any newly created, future versions (e.g., versions 6, 7, and 8) created after the specific version is put into this hold container with the hold all versions policy type will be put into this hold container automatically.

Hold specific version and newer versions type (hold version policy 3#): When a specific version is put in this hold container, all versions created after the specific version was created will also be put in this hold container automatically. For example, if there are versions 1, 2, 3, 4, and 5 (created in that order), and version 3 is put into the hold container with the hold all versions policy type, then, newer versions 4 and 5 will be put into this hold container automatically. Older versions 1 and 2 are not put into this hold container automatically.

Hold specific version and older versions type (hold version policy 4#): When a specific version is put in this hold container, all older versions created before the specific version was created will be put in this hold container automatically. For example, if there are versions 1, 2, 3, 4, and 5 (created in that order), and version 3 is put into the hold container with the hold all versions policy type, then, older versions 1 and 2 will be put into this hold container automatically. Newer versions 4 and 5 are not put into this hold container automatically.

When an item with a specific version is put into a hold container, the hold versioning system 130 stores a row in a hold link table to retain the relationship provided by the hold version policy type. Later, when a delete operation or an update operation is performed on the item, the hold versioning system 130 first checks the hold link table to see whether this item has a version in any hold container and decides whether the operation is allowed or not.

FIG. 4 illustrates a hold link table 400 in accordance with certain embodiments. The hold link table 400 includes a hold container item identifier (Hold Container ID), an item identifier (Item ID) for the item to be on hold, an item version identifier (Item Version ID) of the version to be on hold, and an optional timestamp (Timestamp). In certain embodiments, the hold link table 400 includes a link item identifier (Link Item ID) that may be used as a primary key. In table 200, the ellipses indicate that there may be one or more other columns in the hold container table.

In certain embodiments, the hold container identifier is 26 characters, is not a key column, and has the constraint "NOT NULL". In certain embodiments, the item identifier of the item to be on hold is 26 characters, is not a key column, and has the constraint "NOT NULL". In certain embodiments, the item version identifier is a small integer, is not a key column, and has the constraint "NOT NULL". In certain embodiments, the timestamp is a timestamp value, is not a key column, and has the constraint "NOT NULL".

With the hold version policy type attribute in the hold container table, the hold versioning system 130 provides an auto-holding mechanism when an item version (Item ID, Version X) is put in a hold container (Hold Container ID).

Figure 5A:
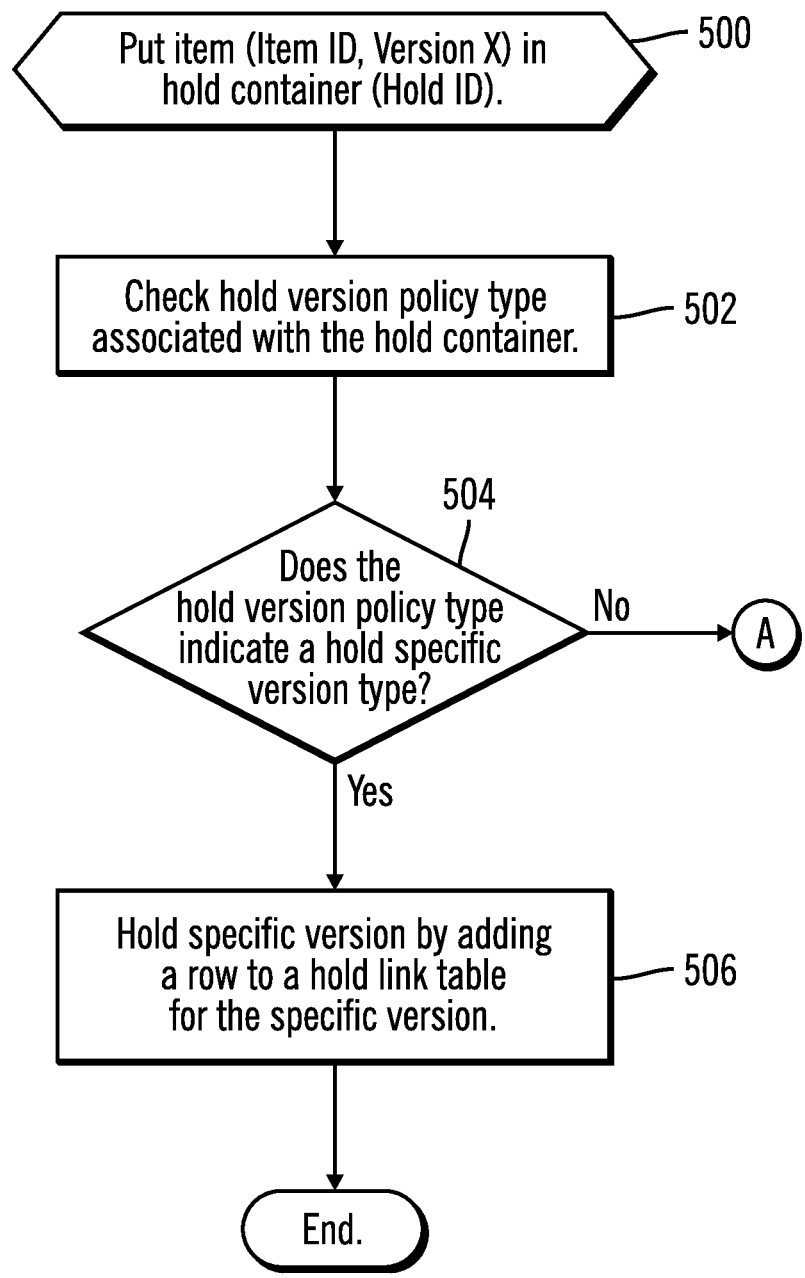
FIGS. 5A, 5B, and 5C illustrate, in a flow diagram, operations for putting an item into a hold container in accordance with certain embodiments.
Figure 5B:
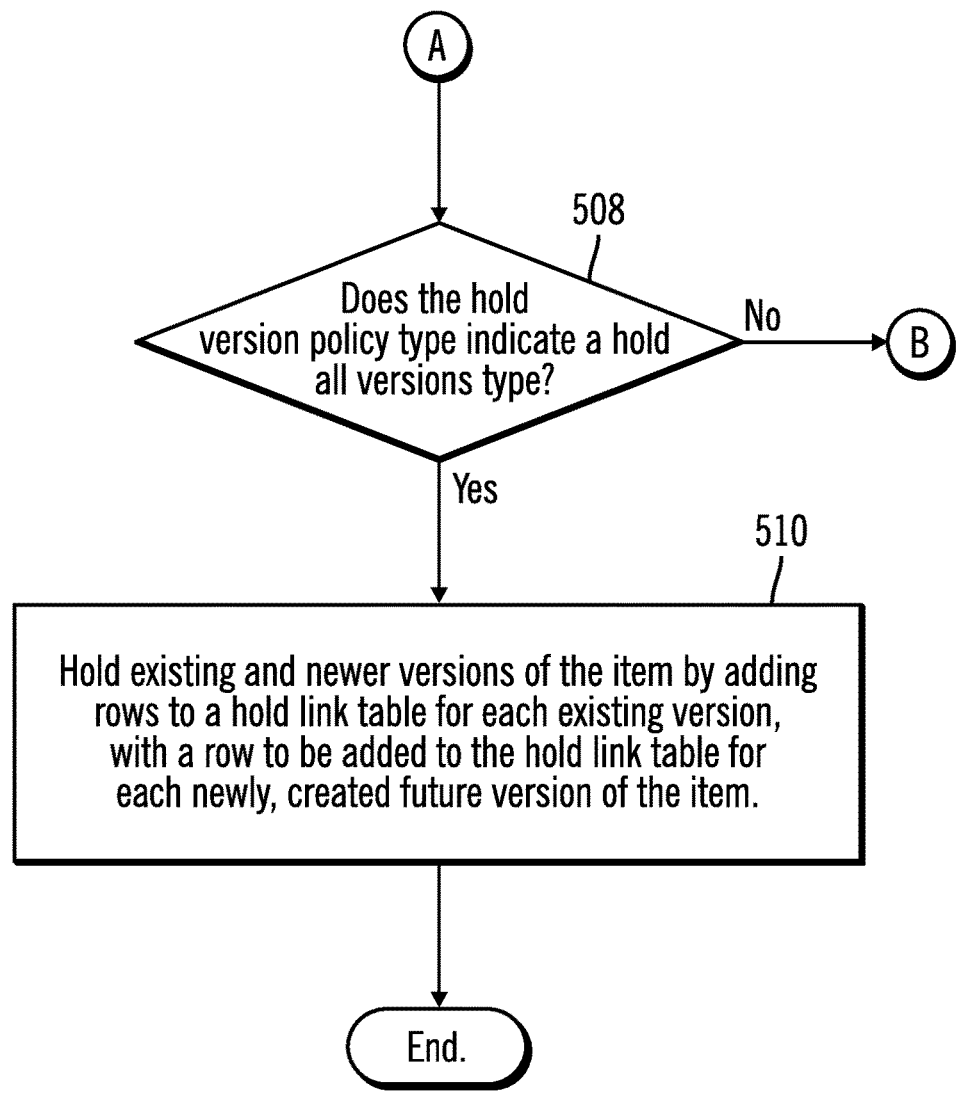
Figure 5C:
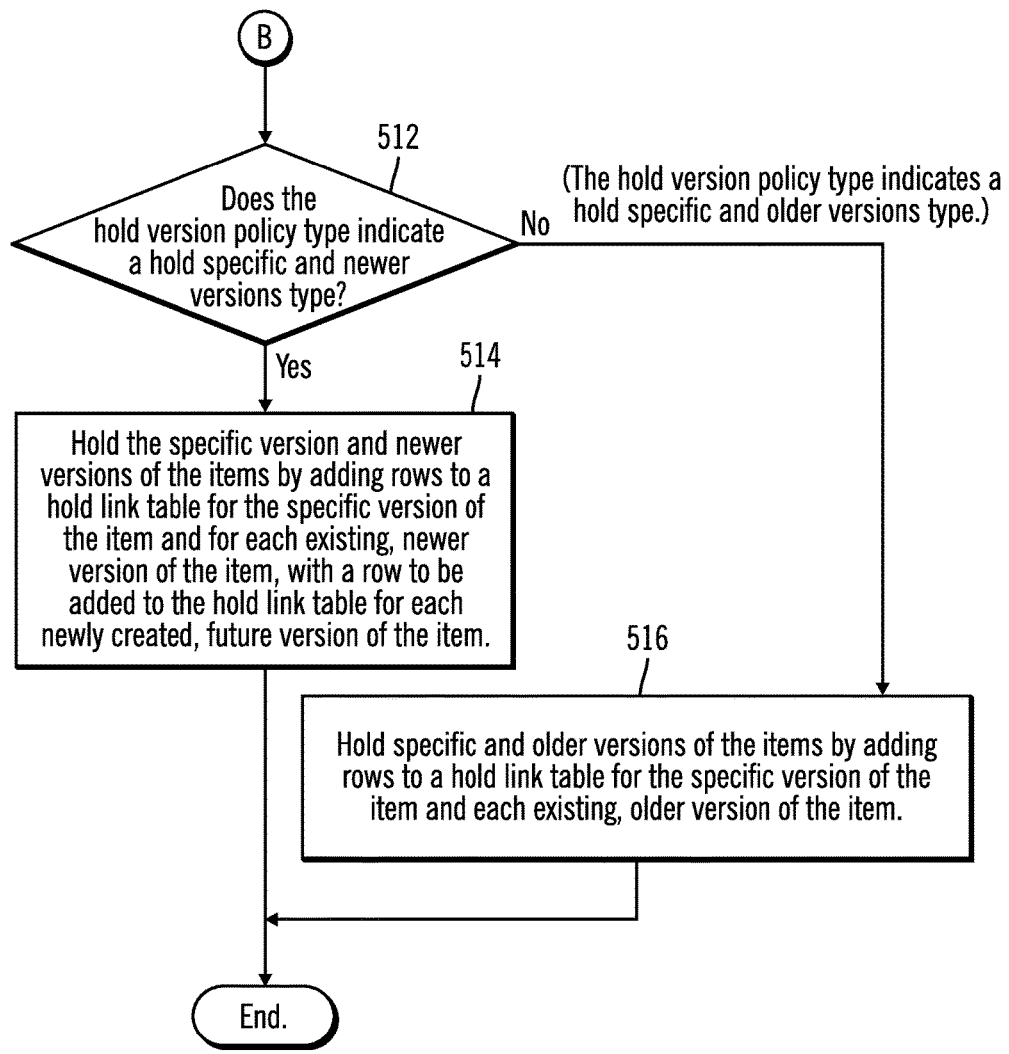

FIGS. 5A, 5B, and 5C illustrate, in a flow diagram, operations for putting an item into a hold container in accordance with certain embodiments. Control begins at block 500 (FIG. 5A) with the hold versioning system 130 putting an item having an item identifier (Item ID) and version (Version X) in a hold container having a hold container identifier (Hold Container ID). In certain embodiments, the hold versioning system 130 receives a "put item into a hold container" request. In block 502, the hold versioning system 130 checks the hold version policy type associated with the hold container. In certain embodiments, this is done by querying the value of the hold version policy type attribute from the hold container table by specifying the hold container identifier and the item identifier.

In block 504, the hold versioning system 130 determines whether the hold version policy type indicates a hold specific version type. If so, processing continues to block 506, otherwise, processing continues to block 508 (FIG. 5B). In block 506, the hold versioning system 130 holds the specific version by adding a row to a hold link table for the specific version. For example, the hold versioning system 130 adds a row to the hold link table with at least the column values of:
<Hold Container ID, Item ID, Version X>

In block 508 (FIG. 5B), the hold versioning system 130 determines whether the hold version policy type indicates a hold all versions type. If so, processing continues to block 510, otherwise, processing continues to block 512 (FIG. 5C). In block 510, the hold versioning system 130 holds existing and newer versions of the items by adding rows to the hold link table for each existing version of the item, with a row to be added to the hold link table for each newly created, future version of the item. For example, the hold versioning system 130 may add the following rows to the hold link table with at least the column values of:
<Hold Container ID, Item ID, Version 1>
. . . (where these ellipses represent the existing, older versions of this item from Version 2 to V(X−1))
<Hold Container ID, Item ID, Version X>
. . . (where these ellipses represent existing, newer versions of this item from V(X+1) to V(Latest Version−1)
<Hold Container ID, Item ID, Latest Version> (where the Latest Version is a newly created, future version)

In block 512, the hold versioning system 130 determines whether the hold version policy type indicates a hold specific version and newer versions type. If so, processing continues to block 514, otherwise, processing continues to block 516.

In block 514, the hold versioning system 130 holds the specific version and newer versions of the items by adding rows to a hold link table for the specific version of the item and for each existing, newer version of the item, with a row to be added to the hold link table for each newly created, future version of the item. For example, the hold versioning system 130 adds the following rows to the hold link table with at least the column values of:
<Hold Container ID, Item ID, Version X>
. . . (where these ellipses represent the existing, newer versions of this item from V(X+1) to V(Latest Version−1)
<Hold Container ID, Item ID, Latest Version> (where the Latest Version is a newly created, future version)

Processing moves to block 516 when the hold version policy type indicates a hold specific version and older versions type. In block 516, the hold versioning system 130 holds specific and older versions of the items by adding rows to a hold link table for the specific version of the item and each existing, older version of the item. For example, the hold versioning system 130 may add the following rows to the hold link table with at least the column values of:
<Hold Container ID, Item ID, Version 1>
. . . (where these ellipses represent the existing, older versions of this item from Version 2 to V(X−1))
<Hold Container ID, Item ID, Version X>

When a new version (Item ID, Version X) is created, the hold versioning system 130 retrieves the hold container list from the hold link table by specifying the item identifier (Item ID) as the query condition, and, if any hold containers are returned, the hold versioning system 130 checks the hold version policy type attribute value of those hold containers one by one and decides whether the newly created version should be put in that hold container.

Figure 6:
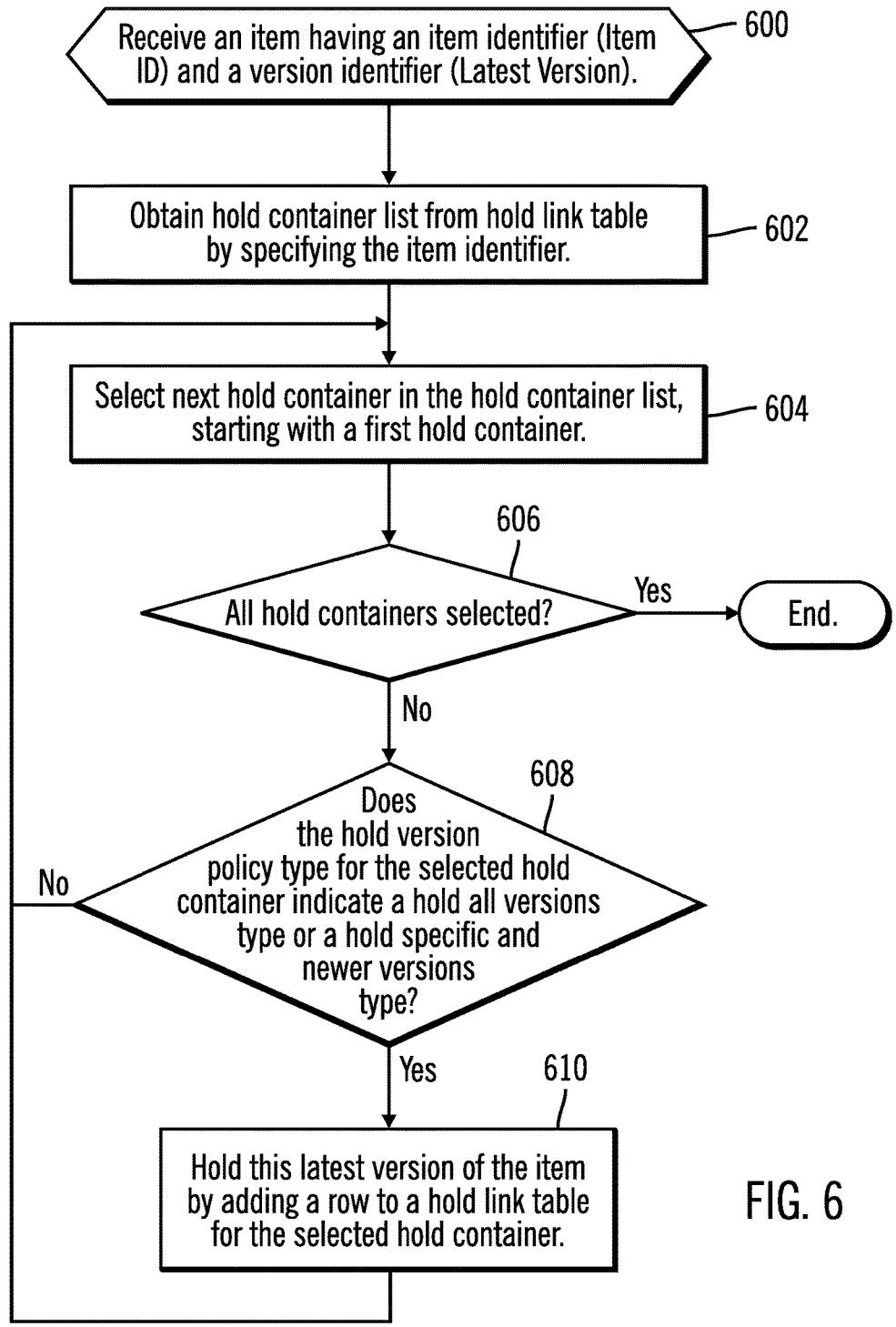
FIG. 6 illustrates, in a flow diagram, operations for processing a newly created, future version of an item in accordance with certain embodiments.

FIG. 6 illustrates, in a flow diagram, operations for processing a newly created, future version of an item in accordance with certain embodiments. Control begins at block 600 with the hold versioning system 130 receiving an item with an item identifier (Item ID) and a version (Latest Version). The operations of FIG. 6 occur for an item that already has a previous version. In block 602, the hold versioning system 130 obtains a hold container list from a hold link table by specifying the item identifier. In certain embodiments, the hold versioning system 130 searches the hold link table for each row having the item identifier, and, for each or these rows, the hold versioning system 130 retrieves the corresponding hold container identifier. The retrieved hold container identifiers form the hold container list. The item may be stored in one or more hold containers.

In block 604, the hold versioning system 130 selects a next hold container in the hold container list, starting with a first hold container. In block 606, the hold versioning system 130 determines whether all hold containers in the hold container list have been selected. If so, processing ends, otherwise, processing continues to block 608.

In block 608, the hold versioning system 130 determines whether the hold version policy type for the selected hold container is a hold all versions type or a hold specific version and newer versions type. If so, processing continues to block 610, otherwise, processing loops back to block 604. In block 610, the hold versioning system 130 holds this version of the item by adding a row to a hold link table with at least the column values of:

<Selected Hold Container ID, Item ID, Latest Version>

From block 610, processing loops to block 604.

Figure 7:
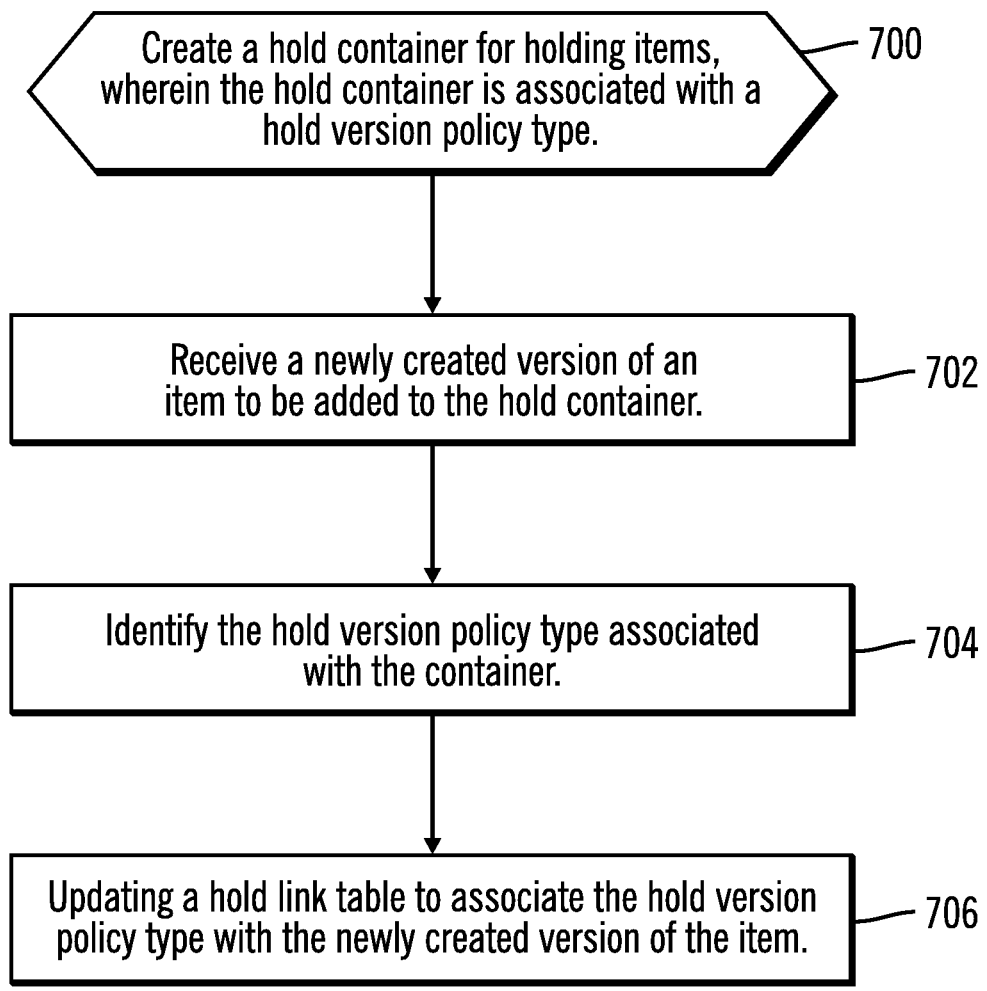
FIG. 7, illustrates in a flow diagram, operations for using a hold container and a hold link table in accordance with certain embodiments.

FIG. 7, illustrates in a flow diagram, operations for using a hold container and a hold link table in accordance with certain embodiments. Control begins at block 700 with the hold versioning system 130 creating a hold container for holding items, wherein the hold container is associated with a hold version policy type. In block 702, the hold versioning system 130 receives a newly created version of an item to be added to the hold container. In block 704, the hold versioning system 130 identifies the hold version policy type associated with the hold container. In block 706, the hold versioning system 130 updates a hold link table to associate the hold version policy type with the newly created version of the item.

The hold versioning system 130 leverages the document version mechanism. With embodiments, one or more specific versions of a document may be deleted, while other versions are on hold (e.g., if a specific and newer versions are on hold, then older versions may be deleted). Similarly, if there is a maximum version constraint on a document, and there is a hold on that document, then, the oldest version is deleted if an update operation is going to create a new version that causes the number of versions of this item to be larger than the maximum version number. Thus, the document may be updated with another version with deletion on, for example, the oldest version that is on-hold.

The hold versioning system 130 eliminates manually placing holds on particular versions (existing or future). The hold versioning system 130 is not limited to enterprise content management products and is applicable to database and other systems that offer hold capabilities.

The hold versioning system 130 provides a technique to hold [e.g., retain or preserve] documents based on a hold version policy (e.g., a version specification) by, responsive to receiving a hold version policy for retaining a document, retaining each version of the document according to the hold version policy. In certain embodiments, the hold version policy is selected from a group consisting of all versions, a list of versions, a date range [less, between two dates, after] for the versions, and other rules [including future versions]. In certain embodiments, the documents are stored in a content management system. In certain embodiments, the hold version policy is received from any of an application programming interface (API), a user interface (UI), a table, an input file, etc.

Figure 8:
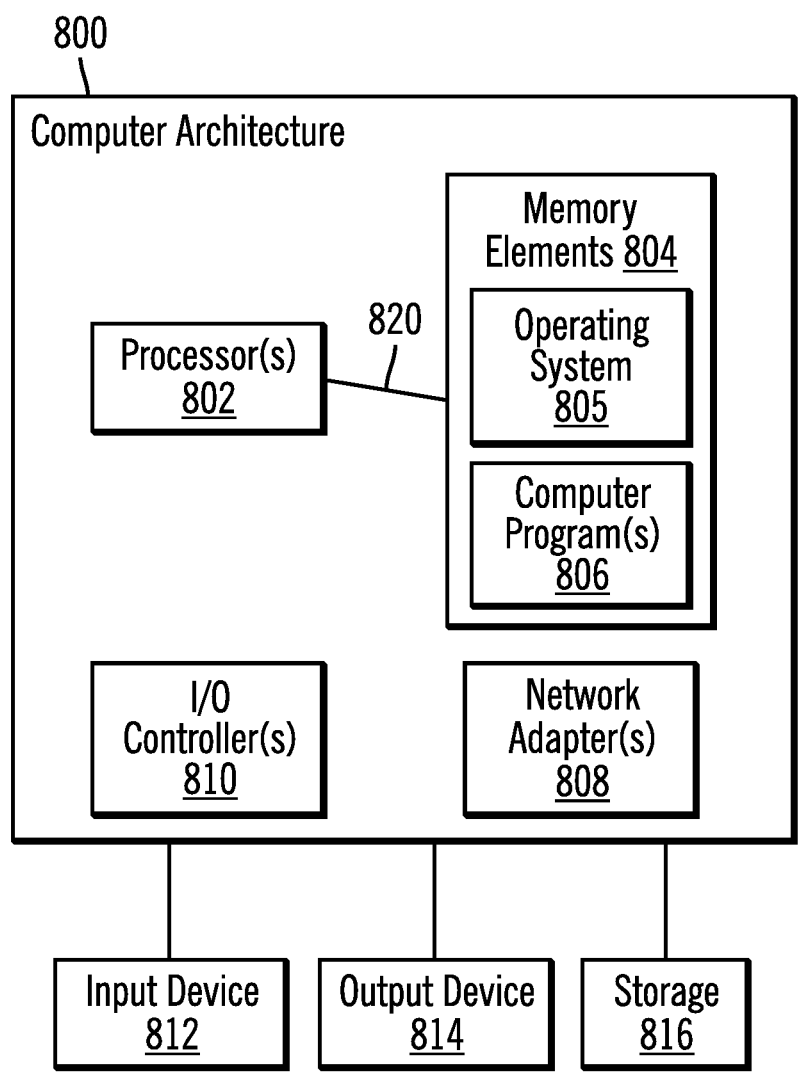
FIG. 8 illustrates, in a block diagram, a computer architecture that may be used in accordance with certain embodiments.

FIG. 8 illustrates a computer architecture 800 that may be used in accordance with certain embodiments. In certain embodiments, server computer 100 may implement computer architecture 800. The computer architecture 800 is suitable for storing and/or executing program code and includes at least one processor 802 coupled directly or indirectly to memory elements 804 through a system bus 820. The memory elements 804 may include local memory employed during actual execution of the program code, bulk storage, and cache memories which provide temporary storage of at least some program code in order to reduce the number of times code must be retrieved from bulk storage during execution. The memory elements 804 include an operating system 805 and one or more computer programs 806.

Input/Output (I/O) devices 812, 814 (including but not limited to keyboards, displays, pointing devices, etc.) may be coupled to the system either directly or through intervening I/O controllers 810.

Network adapters 808 may also be coupled to the system to enable the data processing system to become coupled to other data processing systems or remote printers or storage devices through intervening private or public networks. Modems, cable modem and Ethernet cards are just a few of the currently available types of network adapters 808.

The computer architecture 800 may be coupled to storage 816 (e.g., any type of storage device; a non-volatile storage area, such as magnetic disk drives, optical disk drives, a tape drive, etc.). The storage 816 may comprise an internal storage device or an attached or network accessible storage. Computer programs 806 in storage 816 may be loaded into the memory elements 804 and executed by a processor 802 in a manner known in the art.

The computer architecture 800 may include fewer components than illustrated, additional components not illustrated herein, or some combination of the components illustrated and additional components. The computer architecture 800 may comprise any computing device known in the art, such as a mainframe, server, personal computer, workstation, laptop, handheld computer, telephony device, network appliance, virtualization device, storage controller, etc.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a non-transitory computer readable storage medium having program code embodied therewith, the program code executable by at least one processor to perform:

providing a plurality of hold version policy types comprising: a hold specific version type that places a specific version in a hold container and does not place other versions in the hold container, a hold specific version and newer versions type that places the specific version and the newer versions in the hold container and does not place older versions in the hold container, and a hold specific version and older versions type that places the specific version and the older versions in the hold container and does not place the newer versions in the hold container, wherein the plurality of hold version policy types are auto-binding policies that automatically bind any of the specific versions, the newer versions, and the older versions based on a selected hold version policy type;

creating a hold container with a hold version policy type selected from the hold version policy types;
in response to adding a version of an item to the hold container,
in response to the hold version policy type of the hold container being the hold the specific version and newer versions type, adding a newer version of the item to the hold container; and
in response to the hold version policy type of the hold container being the hold the specific version and older versions type, adding an older version of the item to the hold container; and
in response to receiving a delete operation for the item, using the hold version policy type to determine which versions of the item are to be deleted; and
deleting the version and the determined versions.

2. The computer program product of claim 1, wherein the program code is executable by the at least one processor to perform:
associating the hold version policy type with the version of the item.

3. The computer program product of claim 2, wherein the associating is through a hold link table.

4. The computer program product of claim 1, wherein the versions of the item to be deleted include a newer version of the item.

5. The computer program product of claim 1, wherein the versions of the item to be deleted include an older version of the item.

6. The computer program product of claim 1, wherein the hold version policy type is a hold all versions type.

7. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations, the operations comprising:
providing a plurality of hold version policy types comprising: a hold specific version type that places a specific version in a hold container and does not place other versions in the hold container, a hold specific version and newer versions type that places the specific version and the newer versions in the hold container and does not place older versions in the hold container, and a hold specific version and older versions type that places the specific version and the older versions in the hold container and does not place the newer versions in the hold container, wherein the plurality of hold version policy types are auto-binding policies that automatically bind any of the specific versions, the newer versions, and the older versions based on a selected hold version policy type;
creating a hold container with a hold version policy type selected from the hold version policy types;
in response to adding a version of an item to the hold container,
in response to the hold version policy type of the hold container being the hold the specific version and newer versions type, adding a newer version of the item to the hold container; and
in response to the hold version policy type of the hold container being the hold the specific version and older versions type, adding an older version of the item to the hold container; and
in response to receiving a delete operation for the item, using the hold version policy type to determine which versions of the item are to be deleted; and
deleting the version and the determined versions.

8. The computer system of claim 7, wherein the operations further comprise:
associating the hold version policy type with the version of the item.

9. The computer system of claim 8, wherein the associating is through a hold link table.

10. The computer system of claim 7, wherein the versions of the item to be deleted include a newer version of the item.

11. The computer system of claim 7, wherein the versions of the item to be deleted include an older version of the item.

12. The computer system of claim 7, wherein the hold version policy type is a hold all versions type.

* * * * *